United States Patent
Park et al.

(10) Patent No.: US 9,049,682 B2
(45) Date of Patent: *Jun. 2, 2015

(54) METHOD AND APPARATUS FOR IDLE MODE OPERATION FOR M2M COMMUNICATION

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/130,399

(22) PCT Filed: Jul. 12, 2012

(86) PCT No.: PCT/KR2012/005536
§ 371 (c)(1), (2), (4) Date: Dec. 31, 2013

(87) PCT Pub. No.: WO2013/009107
PCT Pub. Date: Jan. 17, 2013

(65) Prior Publication Data
US 2014/0141827 A1    May 22, 2014

Related U.S. Application Data

(60) Provisional application No. 61/507,603, filed on Jul. 14, 2011, provisional application No. 61/536,524, filed on Sep. 19, 2011, provisional application No. 61/536,523, filed on Sep. 19, 2011, provisional application No. 61/536,520, filed on Sep. 19, 2011.

(51) Int. Cl.
*H04W 68/02* (2009.01)
*H04W 4/00* (2009.01)
(Continued)

(52) U.S. Cl.
CPC ............ *H04W 68/02* (2013.01); *H04W 4/005* (2013.01); *H04W 52/0209* (2013.01); *H04W 56/0005* (2013.01); *H04W 48/10* (2013.01); *H04W 68/025* (2013.01)

(58) Field of Classification Search
CPC ..... H04W 72/04; H04W 4/005; H04W 68/02; H04W 52/0209
USPC ................... 455/515; 370/328, 329, 330, 331
See application file for complete search history.

(56) References Cited

U.S. PATENT DOCUMENTS

2009/0143089 A1* 6/2009 Ji et al. ........................ 455/517
2009/0156192 A1 6/2009 Ryu et al.
(Continued)

OTHER PUBLICATIONS

Honggang Li et al., "Optimized schemes of network re-entry for M2M in 16m", IEEE 802.16 Broadband Wireless Access Working Group, May 8, 2011.

(Continued)

*Primary Examiner* — Alex Skripnikov
*Assistant Examiner* — Nicole E King
(74) *Attorney, Agent, or Firm* — McKenna Long & Aldridge LLP

(57) ABSTRACT

Provided are an operating method for machine to machine (M2M) communication and an apparatus using the method. In an idle mode, an M2M device receives a paging message from a base station. The paging message comprises a network connection type and a start offset. The network connection type indicates a resource allocation for a ranging request. The start offset indicates an offset at which to start monitoring the ranging resource for the ranging request.

11 Claims, 5 Drawing Sheets

(51) Int. Cl.
*H04W 52/02* (2009.01)
*H04W 56/00* (2009.01)
*H04W 48/10* (2009.01)

(56) References Cited

U.S. PATENT DOCUMENTS

| | | | |
|---|---|---|---|
| 2009/0168722 A1* | 7/2009 | Saifullah et al. | 370/331 |
| 2009/0170534 A1* | 7/2009 | Ryu et al. | 455/458 |
| 2009/0227265 A1* | 9/2009 | Kang et al. | 455/456.1 |
| 2009/0280812 A1* | 11/2009 | Cheng et al. | 455/436 |
| 2010/0041399 A1* | 2/2010 | Kim et al. | 455/434 |
| 2010/0167756 A1 | 7/2010 | Park et al. | |
| 2010/0246490 A1* | 9/2010 | Lavi et al. | 370/328 |
| 2012/0051300 A1* | 3/2012 | Cho et al. | 370/329 |
| 2013/0005342 A1* | 1/2013 | Cho et al. | 455/438 |

OTHER PUBLICATIONS

Jin Lee et al., "Paging to pull M2M device with ranging parameters", IEEE 802.16 Broadband Wireless Access Working Group, May 8, 2011.

* cited by examiner

METHOD AND APPARATUS FOR IDLE MODE OPERATION FOR M2M COMMUNICATION

This application is a 35 USC §371 National Stage entry of International Application No. PCT/KR2012/005536, filed on Jul. 12, 2012, and claims priority to U.S. Provisional Application Nos. 61/507,603 filed Jul. 14, 2011, 61/536,524 filed Sep. 19, 2011, 61/536,523 filed Sep. 19, 2011 and 61/536,520 filed Sep. 19, 2011, all of which are hereby incorporated by reference in its entirety.

BACKGROUND OF THE INVENTION

1. Field of the invention

The present invention relates to wireless communications, and more particularly, to an operating method in an idle mode for machine to machine (M2M) communication in a wireless communication system, and an apparatus using the method.

2. Related Art

Machine to machine (M2M) communication (also called machine type communication (MTC)) is one type of data communication including one or more entities not requiring human interactions. That is, the M2M communication refers to the concept of communication based on the existing wireless communication network used by a machine device instead of a user equipment used by a user. The machine device used in the M2M communication may be called a M2M device. There are various M2M devices such as a vending machine, a machine of measuring a water level at a dam, etc.

The M2M device has a feature different from that of a typical user equipment. Therefore, a service optimized to the M2M communication may differ from a service optimized to human-to-human communication. In comparison with a current mobile network communication service, the M2M communication may be characterized as a different market scenario, data communication, less costs and efforts, a potentially great number of M2M devices, wide service areas, low traffic for each M2M device, etc.

An idle mode is a mode in which the user equipment wakes up only during a specific duration to transmit or receive data in order to save battery consumption. A network re-entry process is a process in which the user equipment in the idle mode is returned to a connected state with respect to a network.

It is required to consider the M2M communication feature in the operation of the M2M device in the idle mode.

SUMMARY OF THE INVENTION

The present invention provides an operating method in an idle mode for machine to machine (M2M) communication, and an apparatus using the method.

In an aspect, a method for operating in an idle mode for Machine To Machine (M2M) communication is provided. The method includes receiving, by a M2M device in the idle mode, a paging message from a base station, the paging message including a network access type and a start offset, the network access type indicating a resource allocation for a ranging request, the start offset indicating an offset to start to monitor a ranging resource for the ranging request, and monitoring, by the M2M device, the ranging resource for the ranging request beginning from the offset.

The paging message may further include a monitoring duration indicating a time duration to monitor the ranging resource.

The method may further include transmitting, by the M2M device, the ranging request to the base station by using the ranging resource.

The method may further include transmitting, by the M2M device, a ranging code to the base station if the M2M device fails to decode the ranging resource successfully until an expiration of the monitoring duration.

In another aspect, a device for Machine To Machine (M2M) communication includes a radio frequency unit for receiving and transmitting a radio signal, and a processor operatively coupled with the radio frequency unit and configured to receive a paging message from a base station, the paging message including a network access type and a start offset, the network access type indicating a resource allocation for a ranging request, the start offset indicating an offset to start to monitor a ranging resource for the ranging request, and monitor the ranging resource for the ranging request beginning from the offset.

Machine to machine (M2M) communication can achieve network reentry more rapidly, and battery consumption caused by the network reentry can be decreased.

DESCRIPTION OF EXEMPLARY EMBODIMENTS

Figure 1:
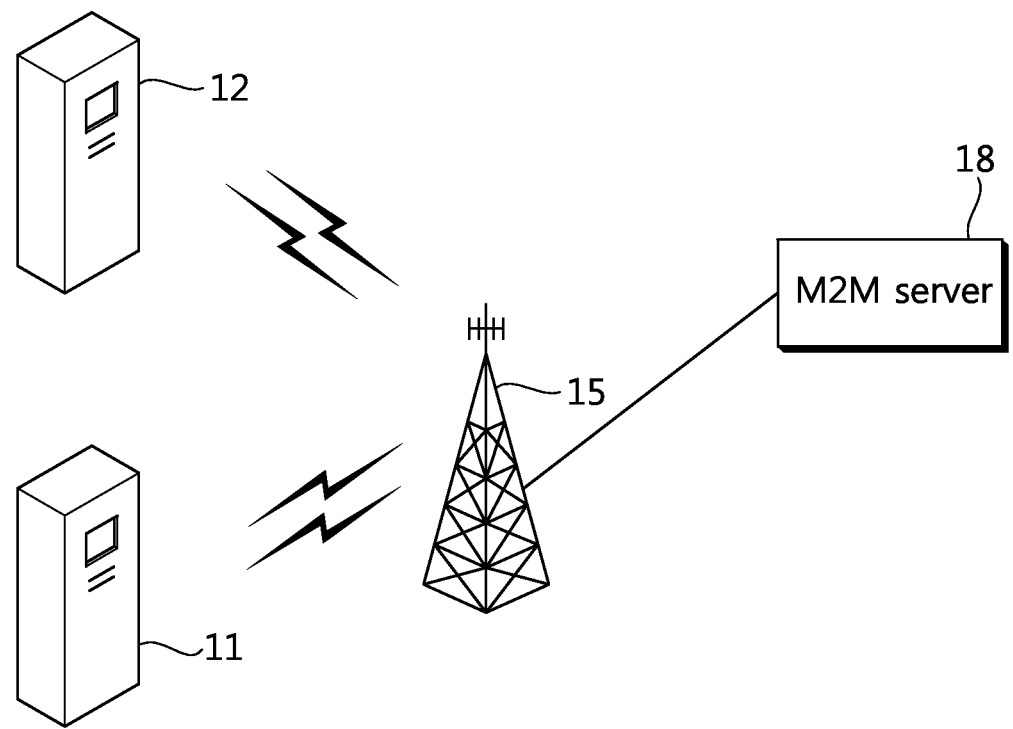
FIG. 1 shows an example of machine to machine (M2M) communication.

FIG. 1 shows an example of machine to machine (M2M) communication.

The M2M communication is also called a machine type communication (MTC), and refers to information exchange between M2M devices 11 and 12 via a base station (BS) 15 without human interactions and information exchange between the M2M device 11 and a M2M server 18 via the BS.

The M2M server 18 is an entity for communicating with the M2M device 11. The M2M server executes a M2M application, and provides a M2M-specific service to the M2M device 11.

The M2M device 11 is a wireless device for providing the M2M communication, and may be fixed or mobile. The M2M device is also called a MTC device.

A service provided using the M2M communication is differentiated from the existing communication service requiring human intervention, and its service range is various, such as tracking, metering, payment, medical field services, remote controlling, etc.

Representative examples of individual service requirements of M2M features are as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) Priority alarm message (PAM) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in a domain of the BS. The BS may assign the same STID to multiple M2M devices.

M2M group identifier (MGID) : It is used to uniquely identify a M2M device group in a domain of a network entity which allocates the MGID.

Now, the idle mode operation in an IEEE 802.16e system will be described with reference to IEEE (Institute of Electrical and Electronics Engineers) 802.16-2009 "Part 16: Air Interface for Broadband Wireless Access Systems"(hereinafter, 802.16e) released at May 29, 2009. However, a wireless communication system to which the present invention is applied is not limited to the IEEE 802.16e-based system. Thus, the present invention is also applicable to various wireless communication systems such as 3GPP (3rd Generation Partnership Project) LTE (Long Term Evolution).

An idle mode is a mechanism by which an MS can periodically determine whether a downlink (DL) broadcast traffic message is available.

In the idle mode, the MS transitions between a paging listening interval and a paging unavailable interval. During the paging unavailable interval, the MS may perform actions (e.g., cell reselection, ranging, etc.) which do not guarantee DL traffic for a BS. In the paging listening interval, the MS monitors the DL traffic.

In order for the MS to enter the idle mode, the MS sends to the BS a deregistration-request (DREG-REG) message for requesting to enter the idle mode. The MS may enter the idle mode by receiving from the BS a deregistration-response (DREG-RSP) message for instructing to start the idle mode.

Alternatively, the BS may transmit a deregistration-command (DREG-CMD) message, so that the MS enters the idle mode.

Figure 2:
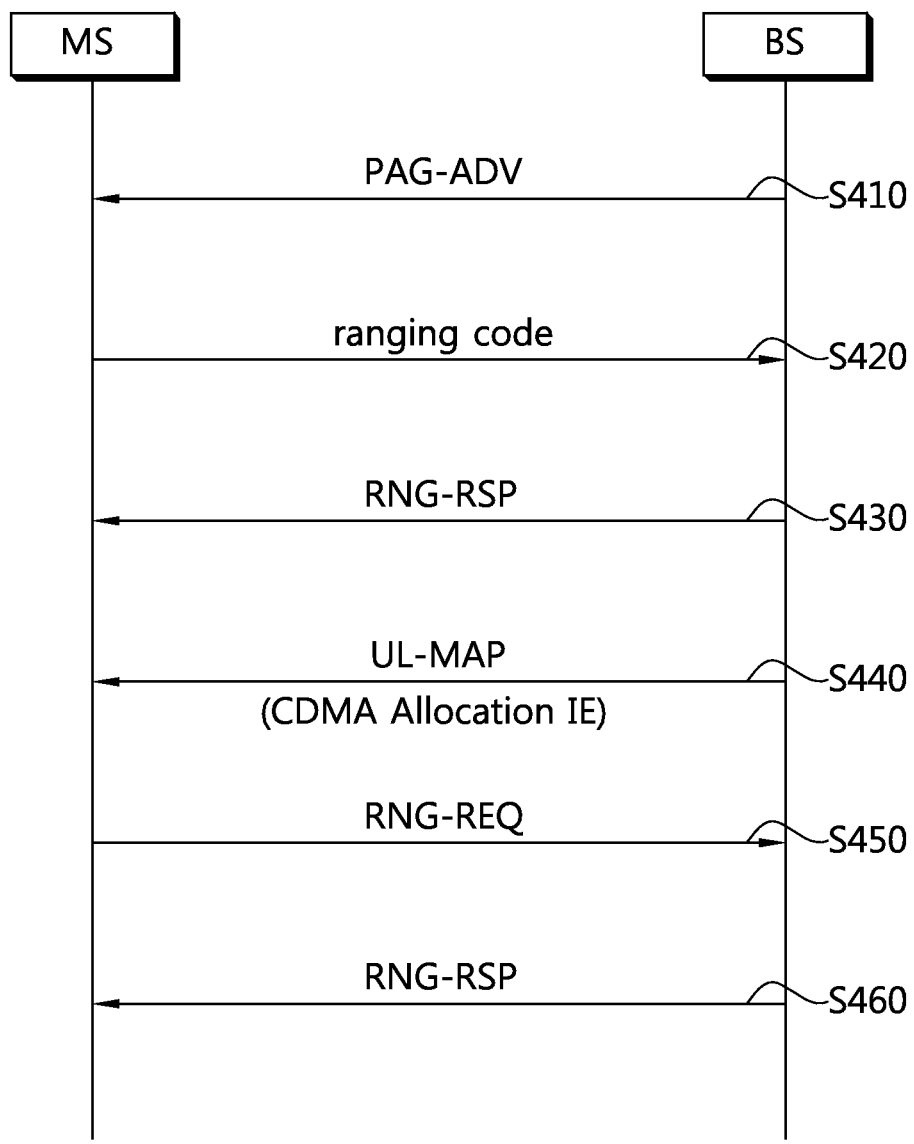
FIG. 2 is a flowchart showing an operation in an idle mode in institute of electrical and electronics engineers (IEEE) 802.16e.

FIG. 2 is a flowchart showing an operation in an idle mode in IEEE 802.16e.

In step S410, in the idle mode, an MS monitors reception of a paging message during a paging available interval, and thus receives a paging advertisement (PAG-ADV) message. The PAG-ADV message is a notification message for indicating whether there is pending DL traffic to a specific MS.

By using the PAG-ADV message, a BS may instruct each MS to perform ranging for a network reentry or a location update.

In step S420, when the PAG-ADV message requests the network reentry, the MS ends the idle mode, and transmits a randomly selected ranging code to the BS.

In step S430, in response to the ranging code, the MS receives a ranging-response (RNG-RSP) message from the BS. The MS regulates UL timing and power on the basis of the RNG-RSP message. The RNG-RSP message includes a status code. The status code indicates one of 'continue', 'success', and 'abort'.

If the received RNG-RSP message has the status code of 'continue', the MS retransmits the ranging code.

If the status code is 'success', in step S440, the MS receives UL-MAP. The UL-MAP includes a CDMA allocation information element (IE).

In step S450, by using a UL resource assignment indicated by the CDMA allocation IE, the MS transmits a ranging-request (RNG-REQ) message to the BS.

In step S460, the MS receives a RNG-RSP message in response to the RNG-REQ message.

In the idle mode, the MS first transmits the ranging code for the network re-entry. The ranging code is randomly selected by the MS from a plurality of code sets, and this is called contention based ranging.

Since the MS has a mobility in a normal mobile communication system, there is no guarantee that UL synchronization is contiguously maintained between the BS and the MS in the idle mode. Therefore, when the MS receives paging in the idle mode, the MS performs UL synchronization by first performing ranging for the network re-entry.

However, in M2M communication, a M2M device scarcely moves. Alternatively, the M2M device having the time controlled feature does not require additional UL synchronization since UL synchronization is continuously maintained.

Therefore, there is a need for an idle mode operation considering the feature of M2M communication.

Figure 3:
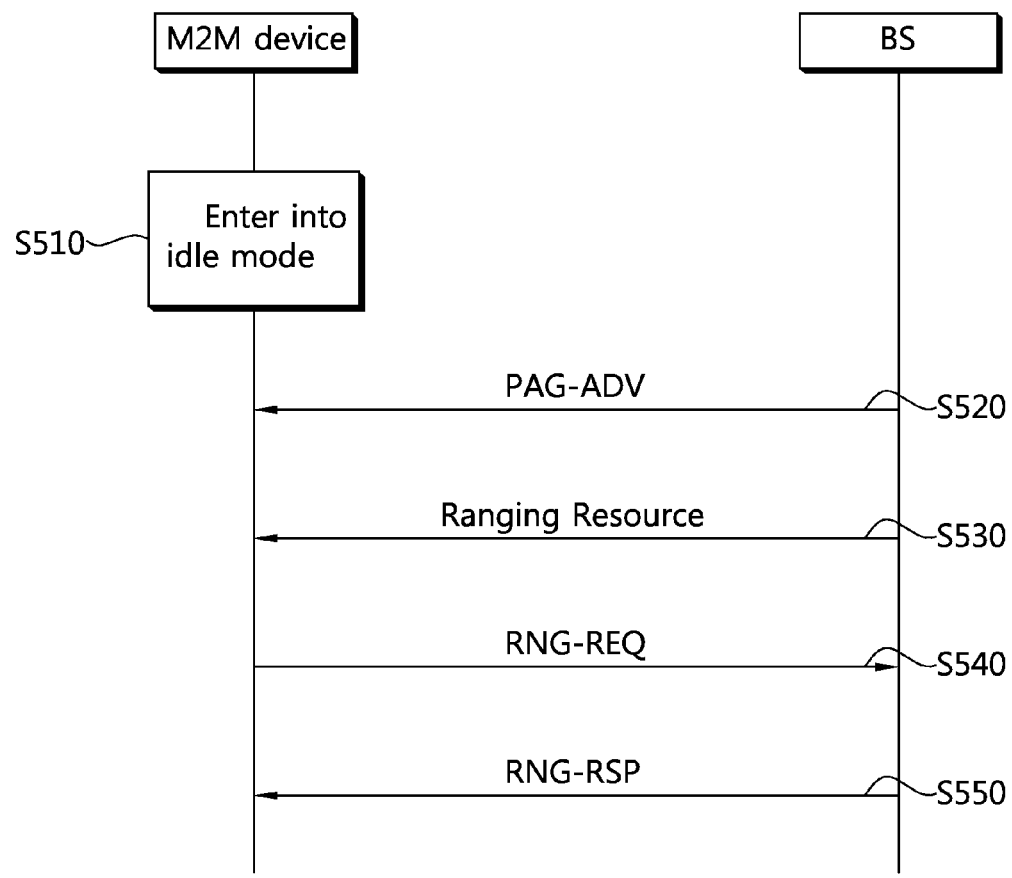
FIG. 3 shows an operation in an idle mode according to an embodiment of the present invention.

FIG. 3 shows an operation in an idle mode according to an embodiment of the present invention. First, a M2M device and a BS negotiate about a mobility status in a network entry process, or negotiate about a UL synchronization status in a network reentry process. Hereinafter, an operation of a M2M device is described when a mobility is low or a UL synchronization is maintained.

In step S510, the M2M device enters the idle mode. The idle mode entry may be performed at a request of the M2M device or at a command from a BS.

In step S520, in the idle mode, the M2M device monitors reception of a paging message during a paging available interval and thus receives a PAG-ADV message. The PAG-ADV message may instruct to perform network reentry to the M2M device.

The proposed PAG-ADV message may include monitoring information capable of monitoring a ranging resource used in transmission of RNG-REQ.

Table 1 below shows an example of fields included in the PAG-ADV message.

TABLE 1

| Field name | Size (byte) | Description |
| --- | --- | --- |
| Action code | 1 | Indicate the purpose of PAG-ADV message. 0b00: perform network reentry 0b01: perform location update 0b10: receive multicast traffic without network reentry 0b11: reallocate MGID |
| Network access type | 1 | Indicate network access type. 0b0: resource allocation for RNG-REQ 0b1: no allocation of dedicated ranging channel |
| MGID | 2 | M2M device's group identifier (15 bits) |
| Start offset | 1 | Indicate an offset at which the M2M device starts to monitor a ranging resource for RNG-REQ. Frame unit. A reference point of this offset is a frame in which a PAG-ADV |

TABLE 1-continued

| Field name | Size (byte) | Description |
|---|---|---|
| | | message is transmitted. |
| Monitoring duration | 1 | Time duration in which the M2M device monitors resources for RNG-REQ. |

The start offset may indicate a location at which monitoring of the ranging resource starts. The monitoring information may include the start offset and the monitoring duration.

As the PAG-ADV message is received, the M2M device ends the idle mode and starts the network reentry process.

In step S530, the M2M device monitors a ranging resource on the basis of monitoring information included in the PAG-ADV message. The ranging resource may include a fast ranging (FR) IE included in the UL-MAP.

Table 2 shows an example of fields included in the FR IE.

TABLE 2

| Field name | Size | Description |
|---|---|---|
| MGID | | M2M device's group identifier |
| M2M ID | | M2M device's identifier. STID or MAC address |
| Duration | | Allocation duration |
| Repetition coding indication | | Indicate repetition code of allocated burst |

In step S540, the M2M device transmits RNG-REQ to the BS by using resource allocation included in the FR IE. If the FR IE is not received until the monitoring duration ends, the M2M device may transmit a ranging code randomly selected. That is, if successful decoding of the FR ID fails during the monitoring duration, the M2M device may transmit the ranging code and perform UL synchronization.

In step S550, the M2M device receives RNG-RSP in response to the RNG-REQ.

Figure 4:
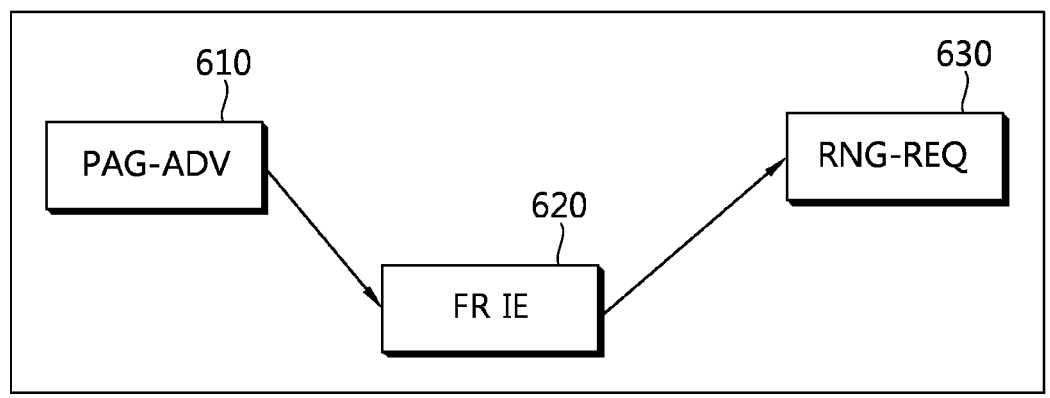
FIG. 4 shows an example of resource allocation of ranging-request (RNG-REQ) using a paging message.

FIG. 4 shows an example of resource allocation of RNG-REQ using a paging message.

A M2M device receives a PAG-ADV message 610 indicating resource allocation of the RNG-REQ. The M2M device monitors an FR IE 620 from a start offset. The M2M device may determine whether it is its FR IE on the basis of a M2M ID included in the FR IE 620.

The M2M device transmits an RNG-REQ 630 by using UL resource allocation included in the FR IE 620.

Under the assumption that the M2M device has no mobility and periodically performs UL transmission to the BS, a network reentry process without ranging is proposed. However, UL synchronization may not be maintained due to a change in a channel situation.

Therefore, if the BS no longer maintains the UL synchronization and thus network reentry for performing ranging is necessary, monitoring information is not included in the paging message. If the access type indicates resource allocation for RNG-REQ but monitoring information does not exist, the M2M device starts a ranging process by transmitting a ranging code to the BS.

In the above table, a field name, a size, and a field value are for exemplary purposes only, and thus can be easily modified to other names and other values by those ordinarily skilled in the art. Not all of the fields proposed in the table are essential, and thus a specific field can be omitted.

Figure 5:
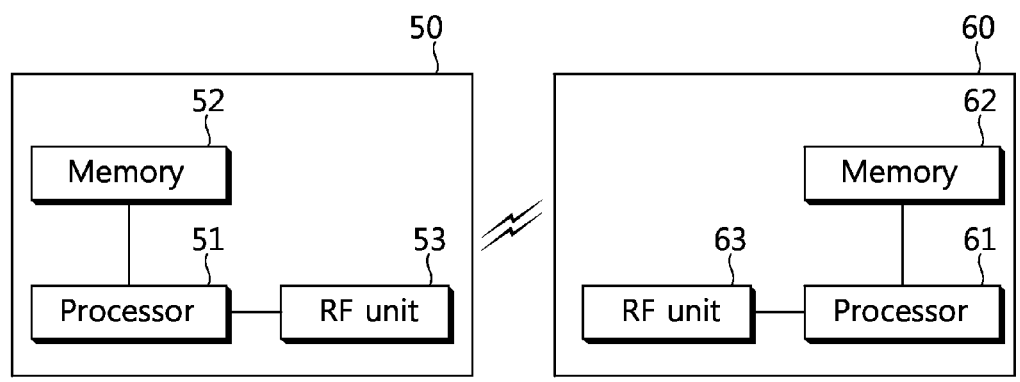
FIG. 5 is a block diagram showing a wireless communication system according to an embodiment of the present invention.

FIG. 5 is a block diagram showing a wireless communication system according to an embodiment of the present invention.

A MTC device 50 includes a processor 51, a memory 52, and a radio frequency (RF) unit 53. The memory 52 is connected to the processor 51 and configured to store various information used for the operations for the processor 51. The RF unit 53 is connected to the processor 51 and configured to send and/or receive a radio signal. The processor 51 implements the proposed functions, processed, and/or methods. In the described embodiments, the operation of the MTC device may be implemented by the processor 51.

ABS 60 includes a processor 61, a memory 62, and an RF unit 63. The memory 62 is connected to the processor 61 and configured to store various information used for the operations for the processor 61. The RF unit 63 is connected to the processor 61 and configured to send and/or receive a radio signal. The processor 61 implements the proposed functions, processed, and/or methods. In the described embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for operating in an idle mode for Machine To Machine (M2M) communication, comprising:
   receiving, by a M2M device in the idle mode, a paging message from a base station, the paging message including a network access type and a start offset, the network access type indicating a resource allocation for a ranging request, the start offset indicating an offset to start to monitor a ranging resource for the ranging request; and
   monitoring, by the M2M device, the ranging resource for the ranging request beginning from the offset,
   wherein a reference point of the start offset is a frame in which the paging message is transmitted, and
   wherein the ranging resource is a Fast Ranging information element.

2. The method of claim 1, wherein the paging message further includes a monitoring duration indicating a time duration to monitor the ranging resource.

3. The method of claim 2, further comprising:
   transmitting, by the M2M device, the ranging request to the base station by using the ranging resource.

4. The method of claim 2, further comprising: transmitting, by the M2M device, a ranging code to the base station if the M2M device fails to decode the ranging resource successfully until an expiration of the monitoring duration.

5. The method of claim 1, wherein the paging message further includes a group identifier that identifies a group to which the M2M device belongs.

6. The method of claim 1, wherein the paging message further includes an action code indicating that the M2M device perform a ranging for a network reentry.

7. A device for Machine To Machine (M2M) communication, the device comprising:
- a radio frequency unit for receiving and transmitting a radio signal; and
- a processor operatively coupled with the radio frequency unit and configured to:
- receive a paging message from a base station, the paging message including a network access type and a start offset, the network access type indicating a resource allocation for a ranging request, the start offset indicating an offset to start to monitor a ranging resource for the ranging request; and
- monitor the ranging resource for the ranging request beginning from the offset,
- wherein a reference point of the start offset is a frame in which the paging message is transmitted, and
- wherein the ranging resource is a Fast Ranging information element.

8. The device of claim 7, wherein the paging message further includes a monitoring duration indicating a time duration to monitor the ranging resource.

9. The device of clam 8, wherein the processor is configured to instruct the radio frequency unit to transmit the ranging request to the base station by using the ranging resource.

10. The device of claim 8, wherein the processor is configured to instruct the radio frequency unit to transmit a ranging code to the base station if the processor fails to decode the ranging resource successfully until an expiration of the monitoring duration.

11. The device of claim 7, wherein the paging message further includes a group identifier that identifies a group to which the M2M device belongs.

\* \* \* \* \*